United States Patent
Komaki

(10) Patent No.: US 7,466,111 B2
(45) Date of Patent: Dec. 16, 2008

(54) POWER SUPPLY UNIT AND PORTABLE APPARATUS UTILIZING THE SAME

(75) Inventor: Takanobu Komaki, Kyoto (JP)

(73) Assignee: Rohm Co., Ltd., Kyoto (JP)

(*) Notice: Subject to any disclaimer, the term of this patent is extended or adjusted under 35 U.S.C. 154(b) by 482 days.

(21) Appl. No.: 11/029,149

(22) Filed: Jan. 4, 2005

(65) Prior Publication Data

US 2005/0151521 A1    Jul. 14, 2005

(30) Foreign Application Priority Data

Jan. 8, 2004    (JP) ............................. 2004-002666

(51) Int. Cl.
  *G05F 1/613* (2006.01)
  *G05F 1/40* (2006.01)
(52) U.S. Cl. .................. 323/224; 323/266; 323/285
(58) Field of Classification Search .............. 323/224, 323/225, 266, 282, 284, 285, 351; 307/12, 307/82
  See application file for complete search history.

(56) References Cited

U.S. PATENT DOCUMENTS

| | | | | |
|---|---|---|---|---|
| 5,267,136 A | * | 11/1993 | Suga et al. | ..................... 307/82 |
| 5,689,460 A | * | 11/1997 | Ooishi | ..................... 365/189.07 |
| 6,091,232 A | * | 7/2000 | Criscione et al. | ............ 323/224 |
| 6,348,781 B1 | * | 2/2002 | Midya et al. | ................ 323/224 |

FOREIGN PATENT DOCUMENTS

| | | |
|---|---|---|
| JP | 06-067744 | 3/1994 |
| JP | 08-331036 | 12/1996 |
| JP | 2002-171748 | 6/2002 |
| JP | 2003-180073 | 6/2003 |

* cited by examiner

*Primary Examiner*—Jessica Han
(74) *Attorney, Agent, or Firm*—Hogan & Hartson LLP

(57) ABSTRACT

An input source voltage is supplied from a battery for example to a switching power supply circuit such as a switching DC-DC converter via a series regulator for stepping down the input source voltage by a constant voltage. The series regulator serves as a buffer having a variable resistance to reduce the switching noise generated by the switching power supply circuit, thereby reducing the switching noise in the input source voltage and in turn reducing adverse influence of the noise on other circuit blocks that operate at the input source voltage.

13 Claims, 2 Drawing Sheets

Prior Art

POWER SUPPLY UNIT AND PORTABLE APPARATUS UTILIZING THE SAME

FIELD OF THE INVENTION

This invention relates to a power supply unit that utilizes a switching DC-DC converter (hereinafter referred to as DC-DC converter) and a portable apparatus, such as a mobile phone, a personal computer, and a PDA, incorporating such power supply unit, and more particularly to a power supply unit and a portable apparatus powered by a battery.

BACKGROUND OF THE INVENTION

There have been widely used as power supply units switching DC-DC converters for converting an input voltage to a predetermined output voltage through switching of the input voltage.

These DC-DC converters have high power conversion efficiency as compared with series regulators. For this reason, many of portable apparatuses such as mobile phones, personal computers, and PDAs powered by a battery utilizes a DC-DC converter as a power supply unit for acquiring a predetermined operating voltage different from the battery voltage.

FIG. 3 illustrates a conventional DC-DC converter 40. The input source voltage (referred to as battery voltage) Vbat supplied from a battery BAT is converted by the DC-DC converter 40 into a predetermined output voltage Vo. Besides the battery voltage Vbat is used to generate the output voltage Vo, it is also used by various circuit blocks 31-3n of the portable apparatus as their operating voltages.

The battery voltage Vbat may be also converted by a series regulator to a first predetermined voltage to be supplied as an operating voltage of a predetermined circuit block. Japanese Patent Application Laid Open No. H08-331036 discloses a further switching power supply circuit for converting the first predetermined voltage to a second predetermined voltage to be supplied to other circuit blocks.

However, in the DC-DC converter as disclosed in the cited document, switching noise arising from the switching operation in the converter appears on the power source line. If this switching noise is superimposed on the source voltage, the superposed noise will become a cause of adverse influence on other circuit blocks built together with the DC-DC converter in the same IC.

For example, the switching noise can result in erroneous data or deteriorate the linear characteristic of the converter, thereby lowering the overall reliability and deteriorating characteristics of the IC. The switching noise can further disadvantageously affect the operation of the portable apparatus if it is equipped with the IC.

In order to reduce the influence of the switching noise, one might use a filter circuit consisting of a resistor and a capacitor. However, such filter circuit increases power loss by the resistor when the load is heavy.

SUMMARY OF THE INVENTION

It is, therefore, an object of the invention to provide a power supply unit having a switching circuit such as a switching DC-DC for converting the input voltage supplied from a power source e.g. a battery to a required output voltage, while suppressing the influence of its switching noise on the input voltage, thereby reducing adverse influence of the switching noise on other circuit blocks operating at the input voltage.

It is another object of the invention to provide a portable apparatus equipped with such power supply unit capable of reducing the adverse influence of the switching noise as stated above, and hence permitting stable operation of the apparatus.

A power supply unit of the invention comprises:

a series regulator 10 receiving an input source voltage Vbat, and adapted to output a first output voltage Vo1 that is lower than the input source voltage Vbat by a predetermined voltage Vc; and a switching power supply circuit 20 supplied with the first output voltage Vo1 and adapted to output a second output voltage Vo2, wherein the input source voltage Vbat and second output voltage Vo2 are made available to other circuit blocks 31-3n.

The other circuit blocks 31-3n can include a circuit that is fed with the input source voltage and is hence susceptible to noise.

The series regulator 10 is controlled so as to maintain the first output voltage Vo1 lower than the input source voltage Vbat by a constant voltage Vc.

The switching power supply circuit 20 can be a step-down switching power supply circuit adapted to output the second output voltage Vo2 that is lower than the first output voltage Vo1.

The switching power supply circuit 20 is can be a step-up switching power supply circuit adapted to output the second output voltage Vo2 that is higher than the first output voltage Vo1.

The series regulator 10 may include:

a control transistor 11 receiving at one end thereof the input source voltage Vbat and outputting at the other end thereof the first output voltage Vo1;

a reference voltage formation circuit 14 and 15 for forming a reference voltage Vref1 lower than the input source voltage Vbat by a predetermined voltage; and a control circuit, receiving the reference voltage Vref1 and a feedback voltage Vfb1 representing the first output voltage Vo1, for controlling the control transistor 11 based on the reference voltage Vref1 and the feedback voltage Vfb1.

The reference voltage formation circuit 14 and 15 has a resistor 14 and a constant current generation circuit Ic connected in series between the input source voltage Vbat and the ground to provide the reference voltage Vref1 at the node of the series resistor 14 and the constant current generation circuit Ic.

A portable apparatus of the invention utilizes a power supply unit that is supplied with an input source voltage from a battery as described above.

According to the invention, the series regulator serves as a buffer circuit since the switching power supply circuit in the form of a switching DC-DC converter for example is supplied with an input source voltage via the series regulator for stepping down the input source voltage by a constant voltage. The switching noise generated by the switching power supply circuit is attenuated by the series regulator, thereby reducing the switching noise superposed on the input source voltage. Hence, adverse influences of the noise on other circuit blocks operating at the input source voltage can be reduced. Further, deterioration in characteristics of the IC incorporating the switching power supply circuit and the circuit blocks can be suppresses. Adverse influence of the noise on the portable apparatus equipped with the IC can be also reduced.

Since the resistance of the series regulator varies inversely with the current flowing therethrough, the resistance will be larger for a lighter load, and smaller for a heavier load. Hence, the loss factor of the series regulator (defined by the ratio of the power loss to the output power) is maintained substantially constant. In the invention, therefore, the power conversion efficiency of the power supply unit is not greatly lowered if the series regulator is inserted as a buffer circuit.

DETAILED DESCRIPTION OF THE PREFERRED EMBODIMENT

Figure 1:
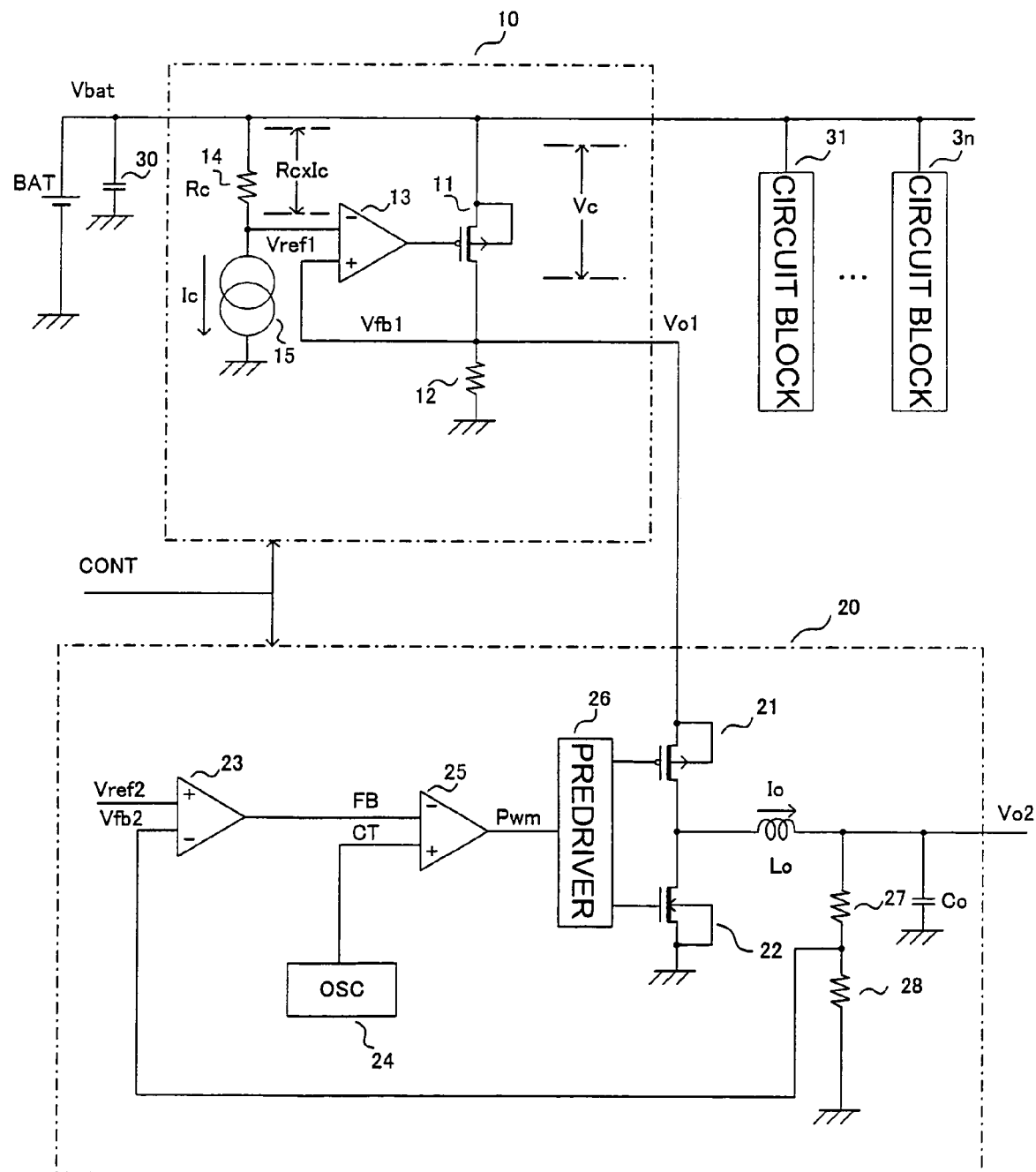
FIG. 1 is a block diagram of a power supply unit and portable apparatus in accordance with one embodiment of the invention.

An embodiment of a power supply unit and a portable apparatus in accordance with the present invention will now be described in detail with reference to the accompanying drawings. FIG. 1 shows the structures of a power supply unit and a portable apparatus in accordance with an embodiment of the invention.

As shown in FIG. 1, a series regulator 10 is supplied with an input source voltage Vbat from a battery BAT and outputs a first output voltage Vo1 that is lower than the input source voltage Vbat by a predetermined voltage Vc. The series regulator 10 supplies its first output voltage Vo1 to a step-down switching DC-DC converter 20 that is adapted to convert the first output voltage Vo1 to a predetermined second output voltage Vo2 that is lower than the first output voltage Vo1. The voltage Vc is preferably of constant magnitude.

The series regulator 10 and the DC-DC converter 20 are enabled and disenabled simultaneously under the control of an externally supplied control signal CONT. In what follows, voltages represent potentials relative to the ground potential unless otherwise stated.

A capacitor 30 collaborates with the series regulator 10 to serve as an RC filter. This capacitor 30 may be provided as an independent element or can be a floating capacitor in the IC.

The input source voltage Vbat is also supplied separately to other regulators and circuit blocks 31-3n including a control circuit than the series regulator 10 and the DC-DC converter 20. These circuit blocks 31-3n include circuits (for example, oscillating circuit) that are fed with the input source voltage Vbat as their operating voltage and susceptible to noise.

The series regulator 10 will now be described in detail. The series regulator 10 is fed with the input source voltage Vbat and outputs a first output voltage Vo1 lower than the input source voltage Vbat by a constant voltage Vc. The voltage Vc suffices to have a voltage, e.g. 0.3 V, that is necessary to control a P-type MOS transistor 11.

The P-type MOS transistor 11 serving as a control transistor and a resistor 12 having a high resistance are connected in series between the input source voltage Vbat and the ground. The first output voltage Vo1 is output from the serial node of the P-type MOS transistor 11 and the resistor 12.

Connected in series between the input source voltage Vbat and the ground are a resistor 14 having a predetermined resistance Rc and a current generation circuit 15 for providing a predetermined constant current Ic. A first reference voltage Vref1 is taken out from the serial node of the resistor 14 and the current generation circuit 15. This first reference voltage Vref1 is lower than the input source voltage Vbat by the constant voltage Vc which equals Rc×Ic.

An error amplifier 13 is fed the first reference voltage Vref1 and a first feedback voltage Vfb1 representing the first output voltage Vo1, and supplies an error signal, based on the difference between the two inputs, to the MOS transistor 11 as a control signal for causing the first feedback voltage Vfb1 to become equal to the first reference voltage Vref1.

As a consequence, the first output voltage Vo1 of the series regulator 10 has a level lower than the input source voltage Vbat by the constant voltage Vc, varying itself to follow the change in the input source voltage Vbat.

It is noted that the resistor 12 is provided to sustain stable control of the series regulator 10 even when the output current of the series regulator 10 is provided intermittently. Thus, its resistance is preferably sufficiently high to reduce the power loss.

Next, the DC-DC converter 20 will now be described in detail. In the DC-DC converter 20, a P-type MOS transistor 21 and an N-type MOS transistor 22 are connected in series between the first output voltage Vo1 and the ground. A switching control signal (PWM signal) having a controlled pulse width is supplied to each gate of the MOS transistors 21 and 22.

The switching voltage of the MOS transistors 21 and 22 is output from the nodes of the MOS transistors to a smoothing coil Lo and a smoothing capacitor Co, where the voltage is smoothed before it is output as a second output voltage Vo2. The magnitude of the output current Io that flows through the smoothing coil Lo is determined by the magnitudes of the load (e.g. circuit block) to which the second output voltage Vo2 is supplied.

The MOS transistors 21 and 22 may preferably have a common dead time during which they are turned off simultaneously. This prevents generation of a penetration current that would flow through the MOS transistors 21 and 22 if generated.

Resistors 27 and 28 are voltage dividing resistors for forming a second feedback voltage Vfb2 for the DC-DC converter 20. The voltage dividing resistors 27 and 28 are impressed with the second output voltage Vo2.

A second reference voltage Vref2 and the second feedback voltage Vfb2 are input to an error amplifier 23, which outputs an error signal FB in accord with the difference between these two input voltages.

An oscillator (OSC) 24 generates a triangular wave signal CT of a predetermined frequency (about 1 MHz for example) for use in pulse-width modulation of the error signal FB. To do this, a PWM comparator 25 compares the error signal FB and the triangular wave signal CT to generate a pulse-width modulation signal Pwm.

A predriver 26 amplifies the PWM signal Pwm to generate a switching control signal (PWM signal) having a polarity required to drive the MOS transistors 21 and 22.

Thus, the second output voltage Vo2 is supplied from the DC-DC converter 20 to predetermined circuit blocks, and the input source voltage Vbat is supplied to other circuit blocks 31-3n.

It is noted that components of in FIG. 1 other than the smoothing coil Lo, smoothing capacitor Co, and battery BAT can be formed on the same IC. A typical portable apparatus includes such IC, smoothing coil Lo, smoothing capacitor Co, and battery BAT along with other necessary elements.

Operation of the inventive portable apparatus will now be described with reference to the accompanying drawings.

To enable both of the series regulator 10 and the DC-DC converter 20, a control signal CONT is supplied to them.

In the series regulator 10, constant current Ic flows through the resistor 14 to create the first reference voltage Vref1, which is input to the input terminal of the error amplifier 13. On the other hand, the electric conductivity of the MOS transistor 11 is controlled so as to bring the first feedback voltage Vfb1 equal to the first reference voltage Vref1, so that the potential drop across the MOS transistor 11 is held to be a substantially constant voltage Vc, allowing the first output voltage Vo1 to follow any change in the input source voltage Vbat and keep its level below the input source voltage Vbat by the constant voltage Vc.

The voltage Vc is the voltage drop due to the resistance R across the source and the drain of the MOS transistor 11, which is given by the product of the resistance R and the current I flowing therethrough. That is, Vc=R×I. Thus, as the current I increases, the potential drop increases, so that the first feedback voltage Vfb1 and hence the gate voltage of the MOS transistor 11, get lowered, thereby lowering the on-resistance of the transistor. In this way, the resistance R decreases if the current I increases and, conversely, increases if the current I decreases. The resistance R of the MOS transistor 11 and the capacitance C of the capacitor 30 together establish an equivalent RC filter having a variable time constant that depends on the variable resistance R.

In the DC-DC converter 20, the MOS transistors 21 and 22 are controlled by the PWM comparator 25 so as to equilibrate the second feedback voltage Vfb2 with the second reference voltage Vref2, thereby maintaining the second output voltage Vo2 at a predetermined voltage. The output current Io is then set to the level in accord with the load of that circuit block to which the second output voltage Vo2 is supplied as the operating voltage.

When the MOS transistor 21 is turned on, the output current Io is supplied from the battery BAT to the load via the MOS transistor 11 of the series regulator 10. On the other hand, when the MOS transistor 21 is turned off, no current flows through the MOS transistor 11, since the output current Io then flows through the MOS transistor 22.

Switching noise arising from the switching of the MOS transistors 21 and 22 is superposed on the input voltage of the DC-DC converter 20, and hence on the first output voltage Vo1.

In the present invention, the equivalent RC filter formed of the resistance R of the MOS transistor 11 of the series regulator 10 and the capacitance C of the capacitor 30 reduces the switching noise superposed on the first output voltage Vo1, thereby lowering the switching noise in the input source voltage Vbat, far below conventional noise. In the inventive power supply unit, when the DC-DC converter 20 is in operation providing a nominal current (for a heavy load), experimentally observed switching noise that appears in the input source voltage Vbat is reduced to about ⅓ of the conventional level (e.g. reduced from 60 mV to 20 mV).

Thus, the adverse influences of the switching noise on the circuit blocks 31-3n receiving the input source voltage Vbat is reduced accordingly. The adverse influences on the entire IC that incorporates the DC-DC converter 20 and the circuit blocks 31-3n, and hence the portable apparatus equipped with the IC, can be also reduced.

Since the resistance R of the MOS transistor 11 changes with the current I, the switching noise reduction capability also changes with the current I.

When the load is light, the-current I is small, so that the resistance R is large and hence efficient noise reduction is attained. For a heavier load, the resistance R is smaller since the current I is larger, so that noise reduction is less efficient as compared for a light load.

The power loss by the MOS transistor 11 of the series regulator 10 is proportional to the current I, since it is given by the product of the current I and the virtually constant voltage Vc. On the other hand, the output power of the series regulator 10 is given by the product of the current I and the first output voltage Vo1. Since the first output voltage Vo1 can be regarded as virtually constant, the loss factor (defined by the ratio, (power loss I2×R)/(output power I×Vo1)) in the series regulator 10 remains substantially constant. In the invention, therefore, if a series regulator is inserted as a buffer circuit, the power conversion efficiency of the power supply unit will not be lowered appreciably.

Figure 2:
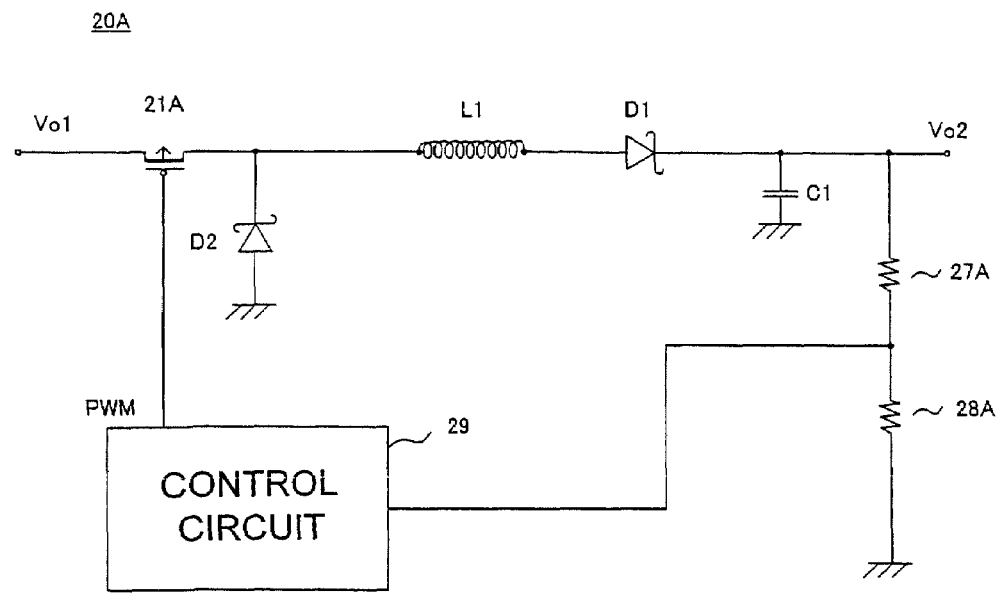
FIG. 2 is a block diagram of another switching power supply circuit for use in the inventive power supply unit.
Figure 3:
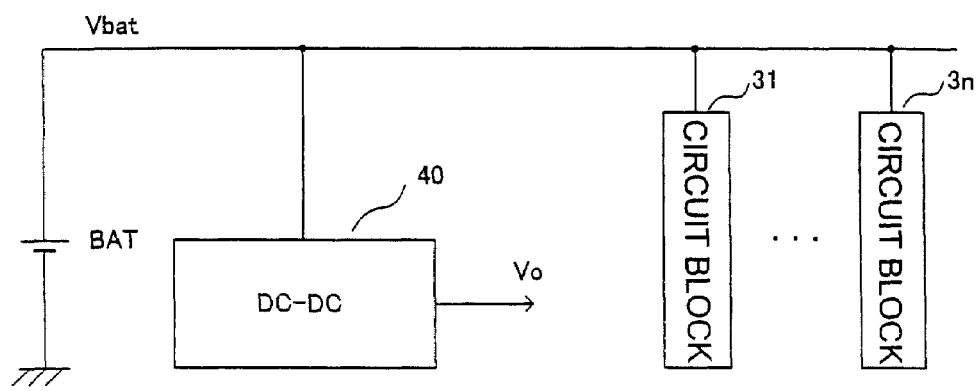
FIG. 3 is a block diagram of a conventional power supply unit.

As an alternative to the switching DC-DC converter, a step-down switching power supply circuit 20A having a coil L1 arranged as shown in FIG. 2 can be used.

This step-down switching power supply circuit 20A is supplied with the first output voltage Vo1, which is fed to the coil L1 via a P-type MOS transistor 21A serving as a switching element. The input end of the coil L1 is grounded via a diode (for example, Schottky diode) D2.

The other end of the coil L1 is connected to a grounded smoothing capacitor C1 via a diode (for example, Schottky diode) D1, providing at the non-grounded end of the capacitor C1 the second output voltage Vo2.

The second output voltage Vo2 is divided by resistors 27A and 28A to generates a feedback voltage to be supplied to a control circuit 29. The control circuit 29 generates a PWM control signal that switches on and off the MOS transistor 21A so as to maintain the feedback voltage at a predetermined level to provide the second predetermined output voltage Vo2.

Although the embodiment shown in FIG. 2 utilizes a step-down switching power supply circuit 20A, an alternative step-up switching power supply circuit utilizing a similar coil can be employed in the invention. For example, a step-up switching power supply circuit can be formed of a coil L1 and an N-type MOS transistor 21B (not shown) serving as a switching element, with the input end of the coil L1 coupled to the first output voltage Vo1 and the output end thereof grounded via the N-type MOS transistor 21B. The node of the coil L1 and the N-type MOS transistor 21B is connected to the grounded smoothing capacitor C1 via a diode (for example, Schottky diode) D1, providing the second output voltage Vo2 at the non-grounded end of the capacitor C1. The second output voltage Vo2 is divided by resistors 27A and 28A to generate a feedback voltage to be supplied to the control circuit 29. The control circuit 29 generates a PWM control signal that switches on and off the MOS transistor 21B so as to maintain the feedback voltage at a predetermined level, thereby providing the second predetermined output voltage Vo2.

It should be understood that the invention can be applied not only to those cases as described above where the second output voltage vo2 is a DC voltage, but also to cases where the output voltage Vo2 is an AC voltage obtained by a switching power supply circuit. It should be also understood that the battery may be replaced by an AC-DC converter providing a required DC input source voltage.

What I claim is:

1. A power supply unit, comprising:
    a series regulator receiving an input source voltage and adapted to output a first output voltage that is lower than said input source voltage; and
    a switching power supply circuit supplied with said first output voltage and adapted to output a second output voltage, wherein
    said series regulator and said switching power supply circuit are simultaneously operated or stopped by a control signal provided from the outside,
    said input source voltage and second output voltage are made available to other circuit blocks,
    wherein said series regulator includes:

a control transistor receiving at one end thereof said input source voltage and outputting at the other end thereof said first output voltage;

a reference voltage formation circuit for forming a reference voltage lower than said input source voltage by a predetermined voltage; and a control circuit receiving said reference voltage and a feedback voltage representing said first output voltage and adapted to control said control transistor based on said reference voltage and said feedback voltage.

2. The power supply unit according to claim 1, wherein said reference voltage formation circuit has a resistor or which one end is connected to said input source voltage and a constant current generation circuit of which one end is connected to a ground voltage, wherein said resistor and said constant current generation circuit are connected in series to provide said reference voltage at the node of said series resistor and constant current generation circuit.

3. A portable apparatus, comprising:
a battery for generating a source voltage; and
a power supply unit according to claim 1.

4. The power supply unit according to claim 1, wherein said switching power supply circuit is a step-down switching power supply circuit adapted to output said second output voltage lower than said first output voltage.

5. The power supply unit according to claim 1, wherein said switching power supply circuit is a step-up switching power supply circuit adapted to output said second output voltage higher than said first output voltage.

6. A power supply unit, comprising:
a series regulator receiving an input source voltage and adapted to output a first output voltage that is lower than said input source voltage; and
a switching power supply circuit supplied with said first output voltage and adapted to output a second output voltage, wherein
said series regulator and said switching power supply circuit are simultaneously operated or stopped by a control signal provided from the outside,
said input source voltage and second output voltage are made available to other circuit blocks, and, said other circuit blocks receiving said input source voltage include circuits that are susceptible to the influence of noise,
wherein said series regulator includes:
a control transistor receiving at one end thereof said input source voltage and outputting at the other end thereof said first output voltage;
a reference voltage formation circuit for forming a reference voltage Vref1 lower than said input source voltage by a predetermined voltage; and
a control circuit receiving said reference voltage and a feedback voltage representing said first output voltage and adapted to control said control transistor based on said reference voltage and said feedback voltage.

7. The power supply unit according to claim 6, wherein said reference voltage formation circuit has a resistor of which one end is connected to said input source voltage and a constant current generation circuit of which one end is connected to a ground voltage, wherein said resistor and said constant current generation circuit are connected in series to provide said reference voltage at the node of said series resistor and constant current generation circuit.

8. The power supply unit according to claim 6, wherein said switching power supply circuit is a step-down switching power supply circuit adapted to output said second output voltage lower than said first output voltage.

9. The power supply unit according to claim 6, wherein said switching power supply circuit is a step-up switching power supply circuit adapted to output said second output voltage higher than said first output voltage.

10. A power supply unit, comprising:
a series regulator receiving an input source voltage and adapted to output a first output voltage that is lower than said input source voltage; and
a switching power supply circuit supplied with said first output voltage and adapted to output a second output voltage, wherein
said series regulator and said switching power supply circuit are simultaneously operated or stopped by a control signal provided from the outside,
said input source voltage and second output voltage are made available to other circuit blocks, and, said series regulator is controlled so as to maintain said first output voltage lower than said input source voltage by a constant voltage,
wherein said series regulator includes:
a control transistor receiving at one end thereof said input source voltage and outputting at the other end thereof said first output voltage;
a reference voltage formation circuit for forming a reference voltage Vref1 lower than said input source voltage by a predetermined voltage; and
a control circuit receiving said reference voltage and a feedback voltage representing said first output voltage and adapted to control said control transistor based on said reference voltage and said feedback voltage.

11. The power supply unit according to claim 10, wherein said reference voltage formation circuit has a resistor of which one end is connected to said input source voltage and a constant current generation circuit of which one end is connected to a ground voltage, wherein said resistor and said constant current generation circuit are connected in series to provide said reference voltage at the node of said series resistor and constant current generation circuit.

12. The power supply unit according to claim 10, wherein said switching power supply circuit is a step-down switching power supply circuit adapted to output said second output voltage lower than said first output voltage.

13. The power supply unit according to claim 10, wherein said switching power supply circuit is a step-up switching power supply circuit adapted to output said second output voltage higher than said first output voltage.

* * * * *